United States Patent
Ben-Yehuda et al.

(10) Patent No.: US 7,603,392 B2
(45) Date of Patent: Oct. 13, 2009

(54) SYSTEM, METHOD AND COMPUTER PROGRAM PRODUCT FOR STORING TRANSIENT STATE INFORMATION

(75) Inventors: Shmuel Ben-Yehuda, Haifa (IL); Michael Factor, Haifa (IL); Guy Laden, Tel Aviv-Jaffa (IL); Paula Kim Ta-Shma, Tel Aviv-Jaffa (IL)

(73) Assignee: International Business Machines Corporation, Armonk, NY (US)

( * ) Notice: Subject to any disclaimer, the term of this patent is extended or adjusted under 35 U.S.C. 154(b) by 368 days.

(21) Appl. No.: 11/422,094

(22) Filed: Jun. 5, 2006

(65) Prior Publication Data

US 2007/0282926 A1 Dec. 6, 2007

(51) Int. Cl.
*G06F 12/00* (2006.01)
*G06F 17/30* (2006.01)
(52) U.S. Cl. .................... 707/203; 707/1; 707/200; 707/202; 711/161; 711/162
(58) Field of Classification Search .................. None
See application file for complete search history.

(56) References Cited

U.S. PATENT DOCUMENTS

| | | | | |
|---|---|---|---|---|
| 5,758,174 A | * | 5/1998 | Crump et al. | ............... 713/323 |
| 6,618,851 B1 | * | 9/2003 | Zundel et al. | ............... 717/103 |
| 7,152,147 B2 | * | 12/2006 | Suzuki | ....................... 711/162 |
| 2004/0034752 A1 | * | 2/2004 | Ohran | ........................ 711/161 |
| 2005/0171979 A1 | * | 8/2005 | Stager et al. | ................. 707/200 |
| 2006/0041727 A1 | * | 2/2006 | Adkins et al. | ............... 711/162 |
| 2006/0174075 A1 | * | 8/2006 | Sutoh | ........................... 711/162 |

* cited by examiner

*Primary Examiner*—Tim T. Vo
*Assistant Examiner*—Jay A Morrison
(74) *Attorney, Agent, or Firm*—Jason Far-hadian

(57) ABSTRACT

A method, system and computer program product for storing transient state information, the method includes: defining a first logical storage space within at least one storage device in response to at least one characteristic of a processing system logical memory space utilized for storing current transient state information of the processing system; repetitively storing current transient state information at a logical location within the first logical storage space that corresponds to a logical location of the current transient state information within the processing system logical memory space and storing, within a second logical storage space, previous transient state information.

7 Claims, 3 Drawing Sheets

SYSTEM, METHOD AND COMPUTER PROGRAM PRODUCT FOR STORING TRANSIENT STATE INFORMATION

FIELD OF THE INVENTION

The present invention relates to methods, systems and computer program products that store transient state information.

BACKGROUND OF THE INVENTION

A processing entity is adapted to process information. It can include a processing system (such as a host computer) or a virtual processing entity such as a virtual machine. A processing entity can also include part of a processing system, such as a single process or group of processes within a system.

Information that represents the transient state of the processing entity is usually arranged within multiple blocks that form a processing entity memory space.

The transient state does not include application related information, the content of volatile memory units that are connected to the processing system or that belong to the processing system.

Transient state information can be stored and restored by using transient state information check-pointing. The check-pointing includes repetitively sending to a storage device transient state information at various points in time.

Non-incremental check-pointing techniques involve sending the entire transient state information during each check-pointing iteration while incremental check-pointing involves sending only differences between a current transient state information and previous transient state information.

In many cases there is a need to restore transient state information reflecting the transient state at pervious points in time. This feature can help efficiently overcome from failures that occur during the check-pointing process or at other times.

The management of incremental check-pointing systems and especially incremental check-pointing systems that facilitate a restoration of multiple previous versions of the transient state information is highly complicated.

There is a growing need to provide devices, computer program products and methods that will enable efficient restoration of information.

SUMMARY OF THE PRESENT INVENTION

A method for storing transient state information, the method includes: defining a first logical storage space within at least one storage device in response to at least one characteristic of a processing system logical memory space utilized for storing current transient state information of the processing system; repetitively storing current transient state information at a logical location within the first logical storage space that corresponds to a logical location of the current transient state information within the processing system logical memory space and storing, within a second logical storage space, previous transient state information.

Conveniently, the first and second logical storage spaces correspond to a single physical storage space on the at least one storage device.

Conveniently, the defining includes defining the first logical storage space as a duplicate of the processing system logical memory space.

Conveniently, the storing of the current transient state information and the previous transient state information includes applying continuous data protection techniques.

Conveniently, the defining includes defining a first logical storage space that comprises multiple blocks.

Conveniently, the method includes retrieving current transient state information from the storage device by providing the content of the first logical storage space.

Conveniently, the method includes retrieving previous transient state information from the second logical memory space.

Conveniently, the method includes storing current state information at the first logical storage space and storing, within the second logical storage space, previous transient state information that differs from the current transient state information.

Conveniently, the method includes retrieving previous transient state information that differs from current transient state information from the second logical memory space and retrieving previous transient state information that equals a corresponding current transient state information from the first logical storage space.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

Figure 1:
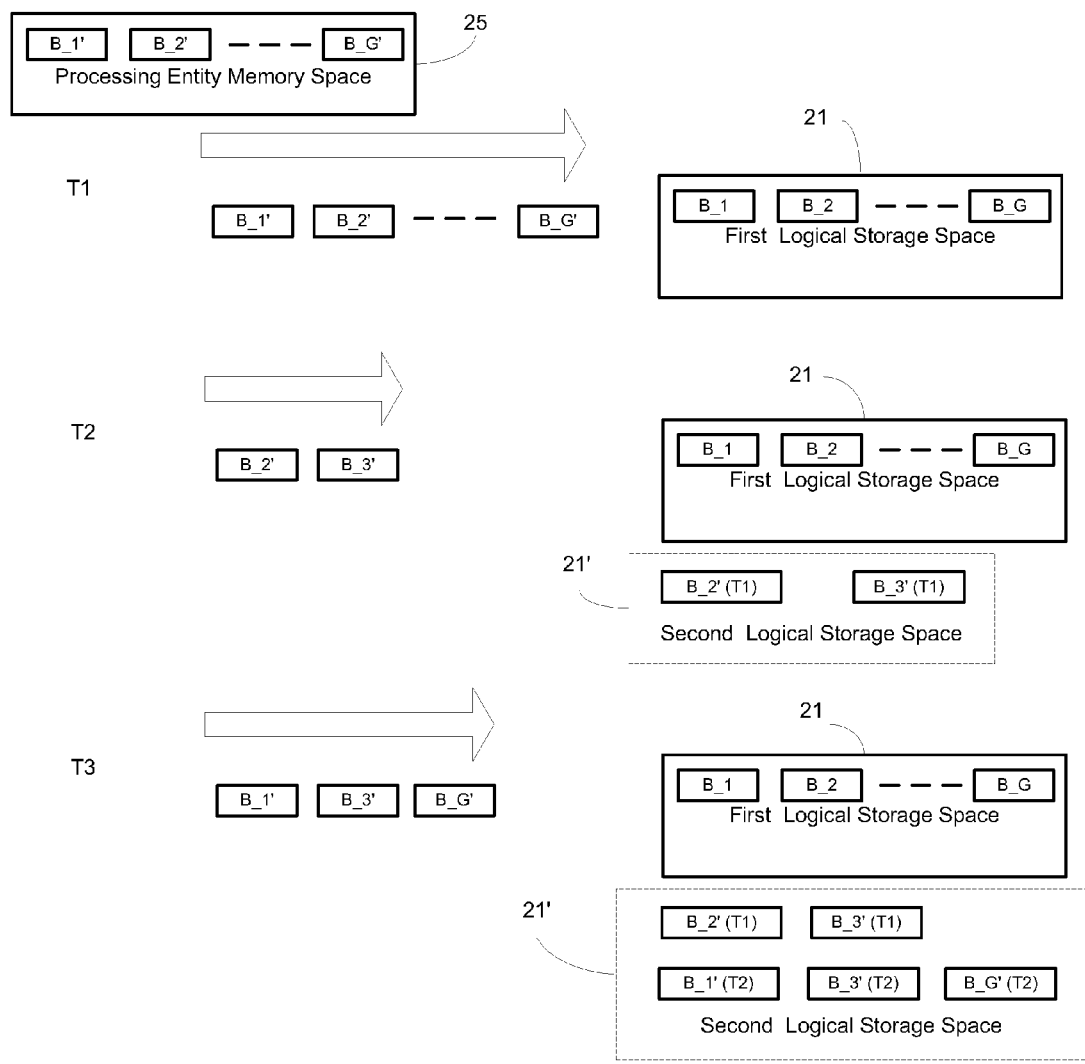
FIG. 1 illustrates a first logical storage space and a processing entity memory space during three exemplary check-pointing operations, according to an embodiment of the invention.

Transient state information representing a transient state of a processing entity (either virtual or physical processing entity) is stored and restored by applying a combination of check-pointing and continuous data protection (CDP) techniques or of check-pointing and snapshots.

A CDP-enabled storage device has a storage mechanism which (transparently to the processing entity) accumulates the history of the updates made to the storage device and enables accessing past versions of the storage device state. The CDP-enabled storage device autonomously organizes the current version of the data as well as previous versions, and performs space reclamation of expired versions as needed.

The transient state information can be stored in a storage device using non-incremental check-pointing or incremental check-pointing techniques. The CDP techniques are adapted to organize previous (historic) versions of transient state information and can optionally perform space reclamation operations.

By utilizing the existing memory management capability of CDP storage devices the complexity of the check-pointing systems is reduced.

Conveniently, current transient information is stored in a first logical storage space that resembles a processing entity memory space. Previous transient state information that does not match the current transient state information will be stored in one or more other logical storage spaces within the storage device.

Conveniently, the first logical storage space and the processing entity memory space have substantially the same size. The first logical storage space is arranged according to the arrangement of the processing entity memory space. Conveniently, the logical location of a certain transient state information portion (such as a transient state information block) within the first logical storage space is substantially the same as its logical location within the processing entity memory space.

This one-to-one mapping between the first logical storage space and the processing entity memory space simplifies the storing and the restoring of the current transient state information. The restoration of a current transient state of the processing entity merely requires a retrieval of the content of blocks starting with the first block.

It is noted that the mentioned above methods and systems can also utilize storage devices that apply CDP methods that do not maintain every write operation made to the device in history. Non-CDP storage devices which support frequent snapshots may also be used. The more frequent the snapshots are taken, the finer the available granularity for time travel.

It is noted that to make best use of the storage device features, the frequency of the checkpoints should be lower than the CDP (or snapshot) granularity.

For simplicity of explanation the following explanation refers to logical unit (LUN) organized storage devices, but the invention can be applied mutatis mutandis to file organized storage devices and also to object-based storage devices.

A logical unit includes multiple fixed size blocks. A block can be addresses by using a logical unit identifier and an offset within the logical unit.

Conveniently the first logical storage space can be addressed by a single logical unit identifier. There is no need to assign different logical unit identifiers to each previous version of transient state information, thus reducing the amount of required logical address identifiers.

When the method is applied on logical unit organized memory units the first logical storage space can be a dedicated logical unit. Assuming that the processing entity memory space is arranged in blocks then each transient state information storing block is check-pointed to a corresponding block within the dedicated logical unit. A block can include one or more blocks or even a fraction of a block. For simplicity of explanation it is assumed that a block includes one block.

The storage device and/or the processing entity can keep track of the timing of the different check-pointing operations, thus enabling a restoration of the transient state information at a given point in time. This can involve notifying the storage device that a check-point operation was (or is being) executed and generating a check-pointing timing data structure at the processing entity.

FIG. 1 illustrates first logical storage space 21 and processing entity memory space 25 during three exemplary check-pointing operations, according to an embodiment of the invention.

First logical storage space 21 includes G blocks denoted B_1-B_G. Processing entity memory space 25 includes G blocks denoted B_1'-B_G'.

It is assumed that the three check-pointing operations occur at times T1-T3. At T1 the whole content of processing entity memory space 25 is sent to first logical storage space 21. The relative locations of blocks B_1-B_G within first logical storage space 21 are the same as the relative locations of B_1'-B_G' within processing entity memory space 25.

Between T1 and T2 blocks B_2' and B_3' were changed. At T2 these blocks will be sent to corresponding blocks B_2 and B_3 within first logical storage space 21.

Figure 2:
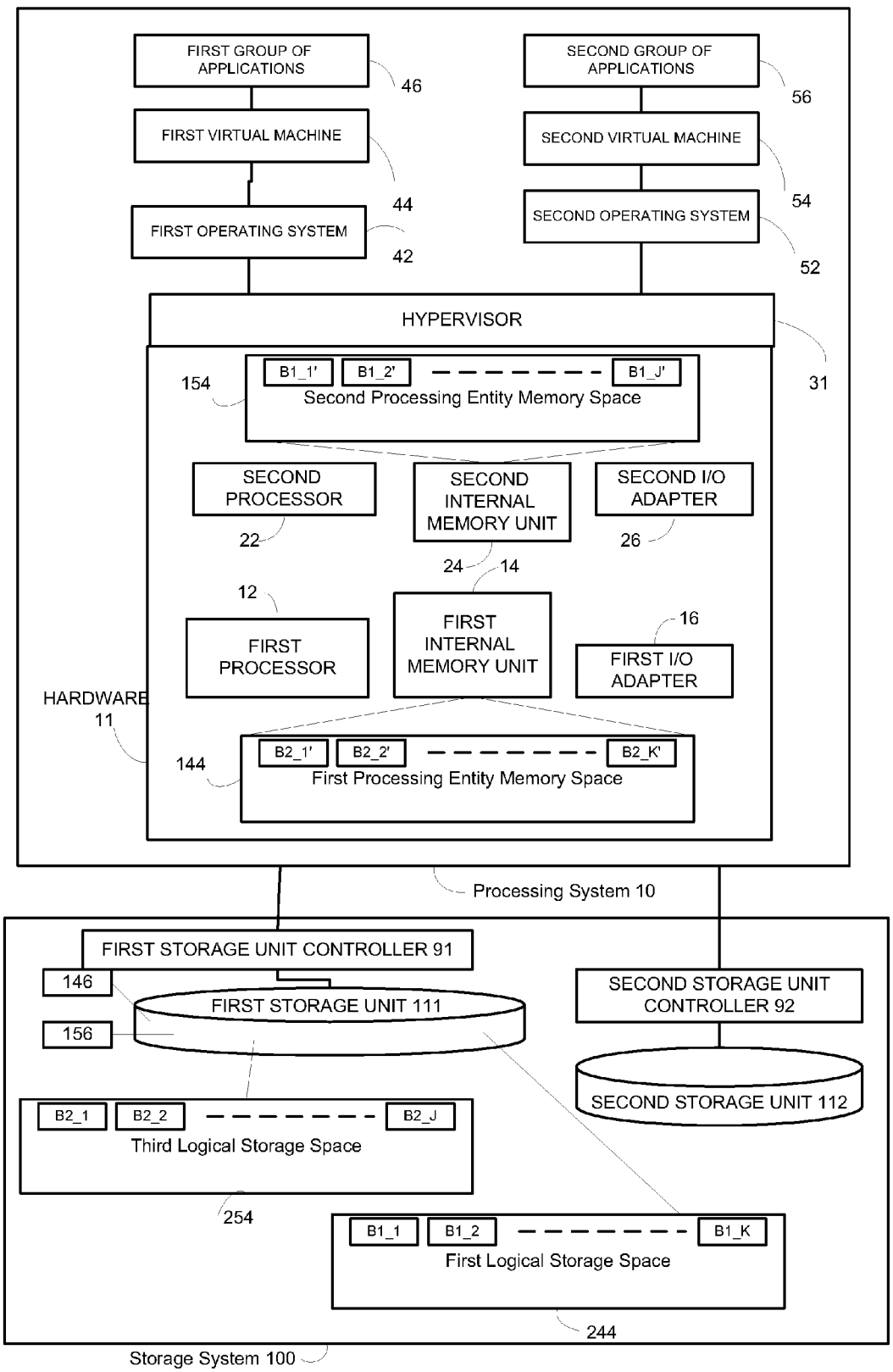
FIG. 2 illustrates a processing system and a storage system according to an embodiment of the invention.

The previous versions of B_2 and B_3 (denoted B_2' (T1) and B_3' (T1)) are stored within other storage spaces of a first storage device such as first storage device 111 of FIG. 2, using built-in CDP capabilities of first storage device 111. These previous versions are associated with a timestamp T1.

Between T2 and T3 blocks B_1', B_3' and B_G' were changed. At T3 these blocks will be sent to corresponding blocks B_1, B_3 and B_G.

The previous versions of B_1', B_3' and B_G' are stored within other logical storage spaces of first storage device 111, using built-in CDP capabilities of first storage device 111. These previous versions are associated with a timestamp T2.

Accordingly, at T3 there are two versions of B_1 (B_1 and B_1(T2)), two versions of B_2 (B_2 and B_2(T1)) two versions of B_G (B_G and B_G(T2)) and three versions of B_3 (B_3, B_3(T1) and B_3(T2)).

Restoring the current transient state of the processing entity (the state at T3) will involve retrieving the content of blocks B_1-B_G. Restoring a previous transient state of the processing entity will involve retrieving older versions of various blocks stored within one or more other logical storage spaces of storage device 111.

The transient state information stored within first logical storage space 21 forms an image of the transient state information at T1. Using previous transient state information the first storage device 111 can provide views of the transient information at one or more previous points in time. It is noted that views of these images can be generated. A view can be writable and the incremental check-pointing process can also be applied on that view.

According to an embodiment of the invention a storage device or even a processing system can store images of transient state information of multiple processing entities.

According to another embodiment of the invention an image of transient state information at a certain point in time can be duplicated and stored within multiple storage devices and/or processing systems.

FIG. 2 illustrates processing system 10 and storage system 100 according to an embodiment of the invention.

Virtual machines such as virtual machines 44 and 54 isolate an operating system from the computer platform that is used to execute the operating system. Operating systems running inside virtual machines can be executed by different computer platforms.

A single computer platform can support multiple virtual machines concurrently. Such a computer platform is commonly referred to as a logically partitioned platform. Each operating system or instance of an operating system is assigned a non-overlapping subset of the computer platform.

Typically, the multiple virtual machines are controlled by a hypervisor, such as hypervisor 31. Hypervisor 31 can manage and enforce partition protection boundaries. See, for example, U.S. Pat. No. 6,839,892 of Dawking et al., which is incorporated herein by reference.

For simplicity of explanation FIG. 2 illustrates two virtual machines, and two sets of hardware components such as processors, internal memory units and IO adapters. It is noted that the number of hardware components of the same kind can exceed two and that the number of virtual machines that can concurrently run can exceed two. Conveniently, the number of virtual machines differs from the number of processors, but this is not necessarily so. For example, a single processor can support multiple virtual machines.

It is further noted that hypervisor 31 is optional, especially in systems that support a single virtual machine.

Those of skill in the art will appreciate that embodiments of the invention can be applied on various processing systems (including distributed processing systems) and various storage systems with out departing from the spirit of the invention. The processing system can be a host computer or server, but this is not necessarily so. The processing system and the storage system can be integrated with each other, remotely positioned from each other, connected directly or indirectly to each other and the like.

Processing system 10 includes hardware 11, hypervisor 31 and two partitions. The first partition includes a first operating system 42, a first virtual machine 44 and a first group of applications 46. The second partition includes a second operating system 52, a second virtual machine 54 and a second group of applications 56.

Hardware 11 includes a first processor 12, a first internal memory unit 14, a first input output (I/O) adapter 16, a second processor 22, a second internal memory unit 24, and a second input output (I/O) adapter 26. First processor 12, first internal memory unit 14 and first I/O adapter 16 cooperate with each other and can operate independently of the second processor 22, second internal memory unit 24, and the second I/O adapter 26.

Conveniently, the hypervisor 31 (also referred to as partition management firmware) is adapted to control the usage of various hardware components by the first and second partitions.

For example, the hypervisor can enable the first operating system 42 (and accordingly the first virtual machine 44) to utilize the first processor 12, a first internal memory unit 14 and the first I/O adapter 16, while the second operating system 54 uses the second processor 22, second internal memory unit 24, and the second I/O adapter 26.

Conveniently, the hypervisor 31 can control the storage operations or can allow another entity (such as one virtual machines 44 and 54) to control the storage operations. The control can be implemented by sending control signals and/or commands between the different components.

First internal memory unit 14 stores transient state information reflecting the transient state of first virtual machine 44. This transient state information is arranged in first processing entity memory space 144. First processing entity memory space 144 includes blocks denoted B1_1'-B1_K'.

Second internal memory unit 24 stores transient state information reflecting the transient state of second virtual machine 54. This transient state information is arranged in second processing entity memory space 154. Second processing entity memory space 154 includes blocks denoted B2_1'-B2_J'.

Storage system 100 stores transient state information of two processing entities (first and second virtual machines 44 and 54) at multiple points in time and also stores additional information such as application related information. The additional information can be originally stored persistent memory of processing system 100.

Storage system 100 includes first storage controller 91, first storage device 111, second storage controller 92 and second storage device 112. First storage controller 91 controls the storage operations to first storage device 111. Second storage controller 92 controls the storage operations to second storage device 112.

First storage device 111 stores transient state information while second storage device 112 stores application related information.

Current transient state information reflecting the current transient state of first virtual machine is arranged in first logical storage space 244. First logical storage space 244 includes blocks denoted B1_1-B1_K. These blocks correspond to blocks B_1'-B_K' of first processing entity memory space 144. Previous transient state information that differs from the current transient state information of first virtual machine 44 are stored in other locations such as within second logical storage space 146.

Current transient state information reflecting the current transient state of second virtual machine 54 is arranged in third logical storage space 254. Third logical storage space 254 includes blocks denoted B2_1-B2_J. These blocks correspond to blocks B_1'-B_J' of second processing entity memory space 154. Previous transient state information that differs from the current transient state information of second virtual machine 54 is stored in other locations other locations such as within second logical storage space 146.

It is noted that transient state information relating to multiple virtual machines can be stored in the same storage device, that current transient state information can be stored in one storage device while previous transient state information can be stored in another storage device, that transient state information and application related information can be stored at the same storage device and the like.

Those of skill in the art will appreciate that each of the components of the storage system 100 can include multiple hardware, firmware and/or software components. For example, each storage device out of storage devices 111 and 112 can include one or more tapes, one or more disks, and the like.

It is further noted that the storage system 100 can have a centralized or distributed architecture. For example, one or more components can be connected to each other over a network and/or via one or more intermediate components. Yet for another example, the first storage unit 11 may include multiple disks, tapes, whereas one or more of these disks/tapes stores current transient state information while other disks/tapes store previous transient state information and optionally current transient state information.

It is noted that the storage of additional information and the storage of transient state information can be executed simultaneously, but this is not necessarily so. The timing of these storage operations should occur in a manner that enables to restore the state of the virtual machine and the content of the persistent memory entity at same time.

The storage operations can be initiated or otherwise controlled by hypervisor 31 or one of the virtual machines (44 or 54).

The invention can take the form of an entirely hardware embodiment, an entirely software embodiment or an embodiment containing both hardware and software elements. In one embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 3:
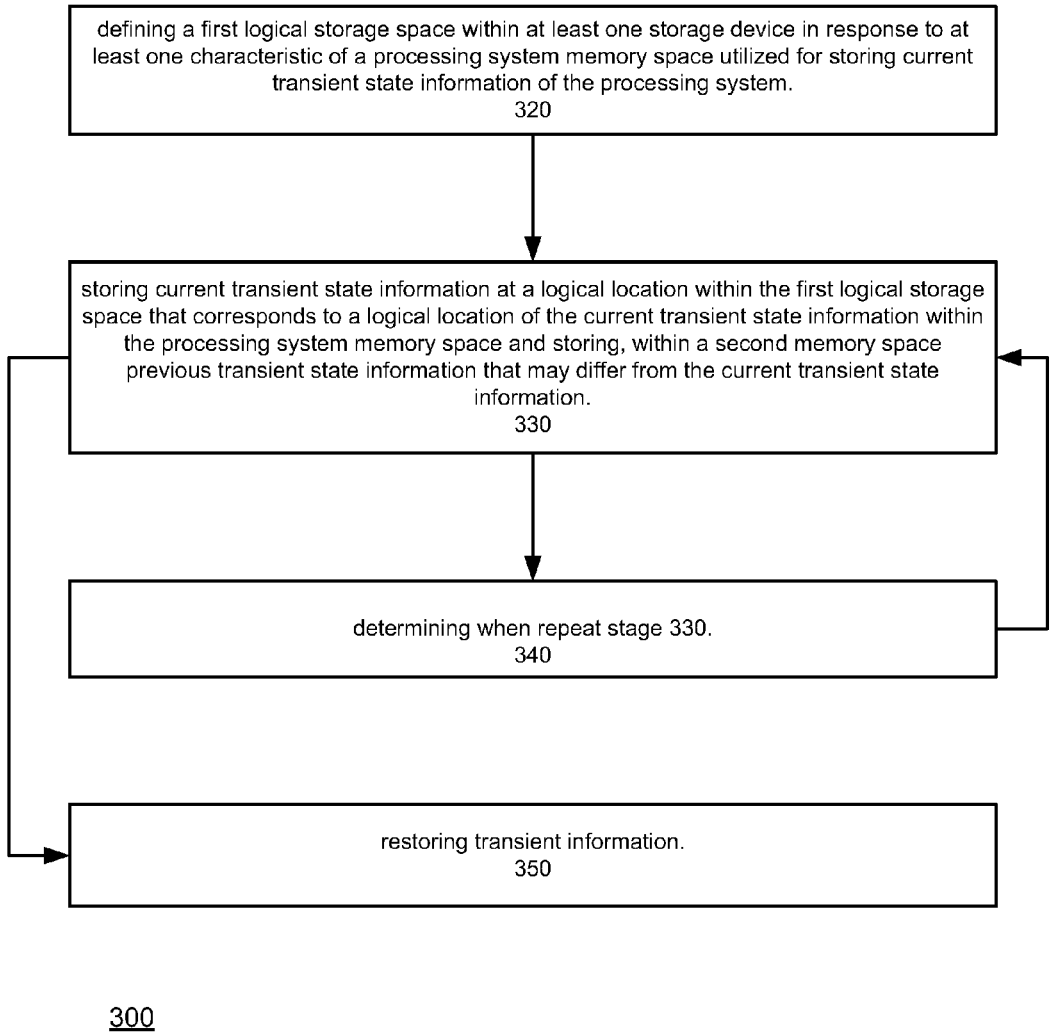
FIG. 3 illustrates a method for storing transient state information, according to an embodiment of the invention.

FIG. 3 illustrates method 300 for storing transient state information, according to an embodiment of the invention.

The method starts by stage 320 of defining a first logical storage space within a storage device in response to at least one characteristic of a processing system logical memory space utilized for storing current transient state information of the processing system. This characteristic can include the size of the processing system logical memory space its continuance the range of addresses that span the processing system logical memory space and the like.

Conveniently, stage 320 includes defining the first logical storage space as a duplicate of the processing system logical memory space.

Conveniently, stage 320 includes defining a first logical storage space as including that comprises multiple blocks.

Stage 320 is followed by stage 330 of storing current transient state information at a location within the first logical storage space that corresponds logically to a location of the current transient state information within the processing system logical memory space and storing, within other logical storage spaces within the storage device, previous transient state information. According to an embodiment of the invention stage 320 includes storing within the other logical storage spaces previous transient state information that differs from the current transient state information, but this is not necessarily so. For example, previous transient state information that equals corresponding current transient state information can be stored within the first logical storage space and within one or other logical storage spaces.

Conveniently, stage 320 includes applying continuous data protection techniques.

Conveniently, stage 320 includes sending to the storage device current transient state information that differs from previous transient state information.

Stage 330 is followed by stage 340 of determining when to repeat stage 330, conveniently according to a predefined storage policy. This storage policy can include multiple and/or frequent repetitions of stage 330.

Method 300 can further include stage 350 of restoring transient information. If the current transient information is restored then stage 350 includes retrieving current transient state information from the storage device by providing the content of the first logical storage space.

The restoration can occur after a failure, in response to a request or in response to another event. If the stored information enables to restore the state at multiple points in time the restoration includes selections a point in time out of multiple possible points in time.

It is noted that a revert operation (a request to update the current transient state information to reflect that transient state at a previous point in time) may involve a replacement of transient state information within the first logical space with transient state information previously stored in another logical storage space. Thus, previous transient state information can become current transient state information while current transient state information can become previous transient state information.

Variations, modifications, and other implementations of what is described herein will occur to those of ordinary skill in the art without departing from the spirit and the scope of the invention as claimed.

Accordingly, the invention is to be defined not by the preceding illustrative description but instead by the spirit and scope of the following claims.

We claim:

1. A method for storing transient state information, the method comprising:

defining a first logical storage space within at least one storage device, wherein the first logical storage space is defined according to at least one characteristic of a first logical memory space in a volatile storage medium utilized for storing transient state information of a processing system;

copying transient state information from a first logical location within the first logical memory space to a second logical location within the first logical storage space;

determining at predetermined time intervals whether the transient state information stored at the first location within the first logical memory space has changed; and moving the transient state information stored at the second logical location within the first logical storage space to a second logical storage space, in response to determining that the transient information stored at the first logical location within the first logical memory space has changed, wherein there is a one-to-one mapping between the first logical memory space and the first logical storage space.

2. The method according to claim 1, wherein the first and second logical storage spaces correspond to a single physical storage space on the at least one storage device.

3. The method according to claim 1, wherein the defining comprises defining the first logical storage space as a duplicate of the first logical memory space.

4. The method according to claim 1, wherein the copying and the moving comprise applying continuous data protection (CDP) techniques.

5. The method according to claim 1, wherein the defining comprises defining a first logical storage space that comprises multiple blocks.

6. The method according to claim 1, further comprising retrieving the transient state information from the storage device by providing a content of the first logical storage space.

7. The method according to claim 1, further comprising retrieving the transient state information from the second logical memory space.

* * * * *